(12) United States Patent
Pauly

(10) Patent No.: US 7,577,673 B2
(45) Date of Patent: Aug. 18, 2009

(54) ORGANISING DATA IN A DATABASE

(75) Inventor: Duncan Gunther Pauly, Wiltshire (GB)

(73) Assignee: Coppereye Limited, Wiltshire (GB)

( * ) Notice: Subject to any disclaimer, the term of this patent is extended or adjusted under 35 U.S.C. 154(b) by 365 days.

(21) Appl. No.: 10/469,123

(22) PCT Filed: Feb. 19, 2002

(86) PCT No.: PCT/GB02/00706
§ 371 (c)(1),
(2), (4) Date: Aug. 26, 2003

(87) PCT Pub. No.: WO02/069185
PCT Pub. Date: Sep. 6, 2002

(65) Prior Publication Data
US 2004/0073559 A1    Apr. 15, 2004

(30) Foreign Application Priority Data
Feb. 26, 2001    (GB) ................................ 0104823.0

(51) Int. Cl.
*G06F 17/30* (2006.01)
(52) U.S. Cl. .............................. 707/101; 707/100; 707/5
(58) Field of Classification Search .................... 706/55, 706/20; 707/200, 101, 100, 5; 370/395.64
See application file for complete search history.

(56) References Cited

U.S. PATENT DOCUMENTS

| 5,018,060 A | 5/1991 | Gelb et al. ................... 707/205 |
| 5,130,936 A | 7/1992 | Sheppard et al. ............ 702/123 |
| 5,644,766 A | 7/1997 | Coy et al. .................... 707/204 |
| 5,734,791 A | 3/1998 | Acero et al. ................. 704/222 |
| 5,852,822 A | 12/1998 | Srinivasan et al. |
| 5,893,102 A * | 4/1999 | Maimone et al. ............ 707/101 |

(Continued)

FOREIGN PATENT DOCUMENTS

EP    0 522 363 A2    1/1993

(Continued)

OTHER PUBLICATIONS

Mondal et al, "R-tree-based Data Migration and Self-Tuning Strategies in Shared-Nothing Spatial Databases", GIS'01, Nov. 9-10, 2001 [online], Sep. 2001 [Retrieved on Mar. 16, 2009]. Retrieved from the Internet: <URL: http://portal.acm.org/ ft_gateway.cfm?id=512169 &type=pdf&coll=          ACM&dl=ACM&CFID=26909136 &CFTOKEN=71423843>.*

(Continued)

*Primary Examiner*—John E Breene
*Assistant Examiner*—Dennis Myint
(74) *Attorney, Agent, or Firm*—Wolf, Greenfield & Sacks, P.C.

(57) ABSTRACT

A database is provided in which conclusion sets (20, 22, 24, 26, 28 and 30) are divided into a hierarchical series of levels (level 1, level 2, level 3). Data is added to a conclusion set at the first level (level 1) until such time as that conclusion set is full. Data is then migrated from the conclusion set (20) to its subordinate conclusion sets (24, 26) therefore reducing the amount of disc access required to add data to the database since multiple entries are migrated in relatively few disc access operations.

10 Claims, 3 Drawing Sheets

U.S. PATENT DOCUMENTS

Figure 1:
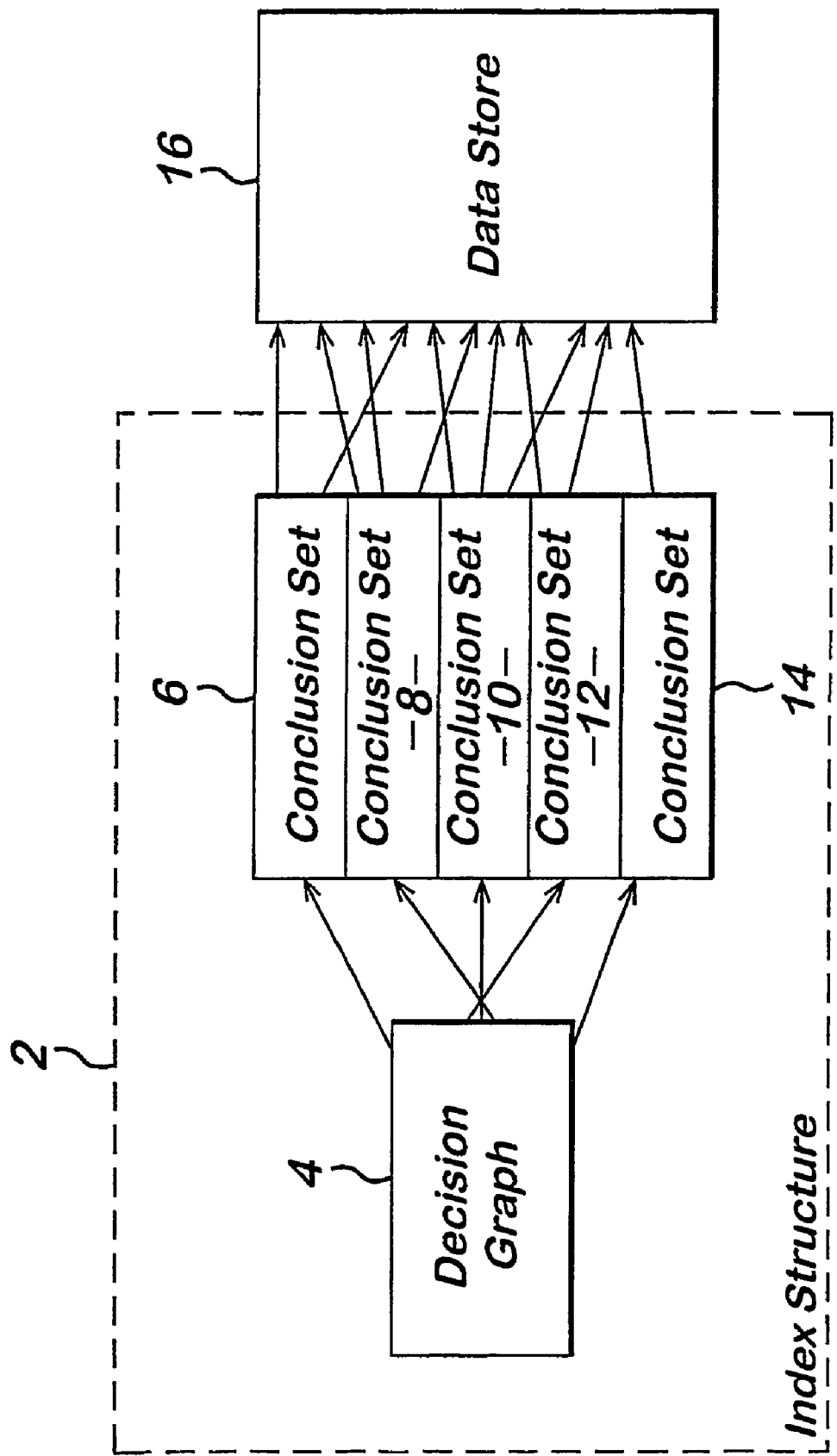

| | | | |
|---|---|---|---|
| 6,269,353 | B1 | 7/2001 | Sethi et al. .................... 706/20 |
| 6,564,197 | B2 | 5/2003 | Sahami et al. ................ 706/55 |
| 2002/0073104 | A1* | 6/2002 | Nunez ........................ 707/200 |
| 2006/0218121 | A1* | 9/2006 | Keith, Jr. ....................... 707/1 |

OTHER PUBLICATIONS

Slagle et al., "Experiments with M & N Tree-searching Program", Communications of the ACM vol. 13, No. 3 [online], Mar. 1970 [Retrieved on Mar. 16, 2009]. Retrieved from the Internet: <URL: http://portal.acm.org/ft_gateway.cfm?id=362054&type=pdf&coll=ACM&dl=ACM&CFID=26909136&CFTOKEN=71423843>.*

Dailey, W.H., "On Generating Binary Decision Trees with Minimum Nodes" [online], Dec. 1975 [Retrieved on Mar. 16, 2009]. Retrieved from the Internet < URL: http://portal.acm.org/ ft_gateway.cfm?id=987688&type=pdf&coll=ACM&dl=ACM&CFID=26909136&CFTOKEN=71423843>.*

Schkolnick, Mario, "A Clustering Algorithm for Hierarchical Structures", ACM Transactions on Database Systems vol. 2, No. 1, [online] Mar. 1997, P-27-44 [ Retrieved on Mar. 16, 2009]. Retrieved from the Internet: <URL: http://portal.acm.org/ ft_gateway.cfm?id=320531&type=pdf&coll=ACM&dl=ACM&CFID=26909136&CFTOKEN=71423843>.*

Srivastava J. et al., "EfficientAlgorithms for Maintenance of Large Database Indexes", Data Engineering, 1988. Proceedings. Fourth International Conference on, Los Angeles, CA, pp. 402-408.

H.V. Jagadish et al., "Incremental Organization for Data Recording and Warehousing", Proceedings of the $23^{rd}$ VLDB Conference, Athens, Greece, 1997, pp. 16-25.

Jochen Van Den Bercken et al., "A Generic Approach to Bulk Loading Multidimensional Index Structures", Proceedings of the $23^{rd}$ VLDB Conference, Athens, Greece, 1997, 10 pages.

Examination Report dated May 18, 2005 from copending European Application No. 02 712 086.4-2201.

Summons to Oral Proceedings dated Jan. 3, 2008 from counterpart European Application No. 02712086.4.

Response dated Sep. 6, 2005 with amended pages from counterpart European Application No. 02712086.4.

\* cited by examiner

ORGANISING DATA IN A DATABASE

The present invention relates to a method of organising data within a database, and to a database implementing such a method.

Typically databases, whether they are of the type described in the applicant's co-pending British patent application GB 0029238.3, or whether they are of other known types, such as "B-tree" structure have a decision graph or other index which points towards conclusion sets which store data which matches the search criteria. Additionally and/or alternatively the conclusion sets may store pointers which point to the location of the data which matches the search key.

In any database of any reasonable size, the conclusion sets are stored on mass storage media, which at the moment typically means hard disc drives. Hard disc devices tend to be considerably slower than semiconductor memory and consequently database performance can be compromised by having to perform these input/output (I/O) operations with these mass storage devices. Even with a minimal index overhead a database typically has to perform 2 I/O operations as part of the read, modify and rewrite cycle to insert data into the index and conclusion set.

According to a first aspect of the present invention, there is provided a method of organising storage of data in a database, in which conclusion sets for the database are arranged in a hierarchical structure, and in which the conclusion sets are arranged such that items are inserted into a selected conclusion set at a first level of significance until the number of items reaches a threshold value for the selected conclusion set, and then the contents of the selected conclusion set are migrated to subordinate conclusion sets, thereby emptying the selected conclusion set.

It is thus possible to provide a modified conclusion set structure which significantly reduces the number of conclusion sets which immediately follow the output of the decision graph.

Furthermore, it is also possible to distribute conclusion sets within the decision graph.

A prior art database will have a single "layer" of conclusion sets accessible from the decision graph. Every new item of data inserted into the conclusion set will require at least 2 I/O operations to include that data (if the data can belong to only one conclusion set, and possibly more I/O operations if the inserted data can belong to more than one conclusion set).

By organising the conclusion sets in a hierarchical structure, the number of conclusion sets immediately accessible from the decision graph can be much reduced. Indeed, it becomes possible to keep the most hierarchically significant, (that is top level) conclusion sets in fast memory, such as semiconductor memory. This is especially true in those embodiments of the invention in which conclusion sets are distributed through the decision graph.

By holding the top level conclusion sets in semiconductor memory, no I/O cost is incurred when inserting data into the database. It is thus possible to provide a significant improvement in database performance during key and data insertion operations.

Advantageously the high level conclusion sets effectively cache data until such time as the conclusion set becomes fill or the number of entries therein exceeds a predetermined level. The conclusion set is then emptied by migrating its contents to subordinate conclusion sets. During the migration process the data is sorted with reference to a search criterion, that is a search key, such that the data can be expected to be randomly distributed between the immediately subordinate conclusion sets. This filling and migrating process can be repeated for a plurality of hierarchical levels within the conclusion set structure.

The migration of data may require, and indeed often requires, transfer of data between one or more conclusion sets held on mass media storage. Thus disc read and disc write operations are incurred, but now these occur for a conclusion set as a whole rather than for each individual item within the conclusion set and consequently the I/O cost per entry becomes much reduced.

Advantageously, during key retrieval or deletion the appropriate top level conclusion set and each subordinate conclusion set whose decision criteria match the search key are examined in order to see if matching data are stored therein. Thus, the database query overhead is increased compared to prior art databases, but this is acceptable in some database structures where the number of inserts is large, but the number of queries is relatively low.

In those embodiments of the invention where the conclusion sets are distributed throughout the decision graph, the inter-conclusion set distance may be constrained so as to prevent conclusion sets from occurring too frequently.

Advantageously a conclusion set distance parameter is defined by an integer Q. Q can take a number greater than or equal to zero. Thus, for example, a database may be created where Q=0: A conclusion set can be formed at every branch node.
Q=1: A conclusion set can be formed at every other branch node.
Q=2: A conclusion set can be formed at every second branch node.

and so on.

These rules can be maintained throughout the decision graph until the final Q layers of the decision graph are reached. In these layers the rules concerning the hierarchical distance between conclusion sets become unenforceable and hence are not rigorously applied.

According to a second aspect of the present invention, there is provided a database in which conclusion sets for the database are arranged in the hierarchical structure, and in which the conclusion sets are arranged such that items are inserted into a selected conclusion set at a first level of significance until the number of items therein reaches a threshold value, and then the contents of the selected conclusion set are migrated to subordinate conclusion sets, thereby emptying the selected conclusion set.

According to a third aspect of the present invention, there is provided a computer program product for causing a data processor to operate in accordance with the first aspect of the present invention.

Figure 2:
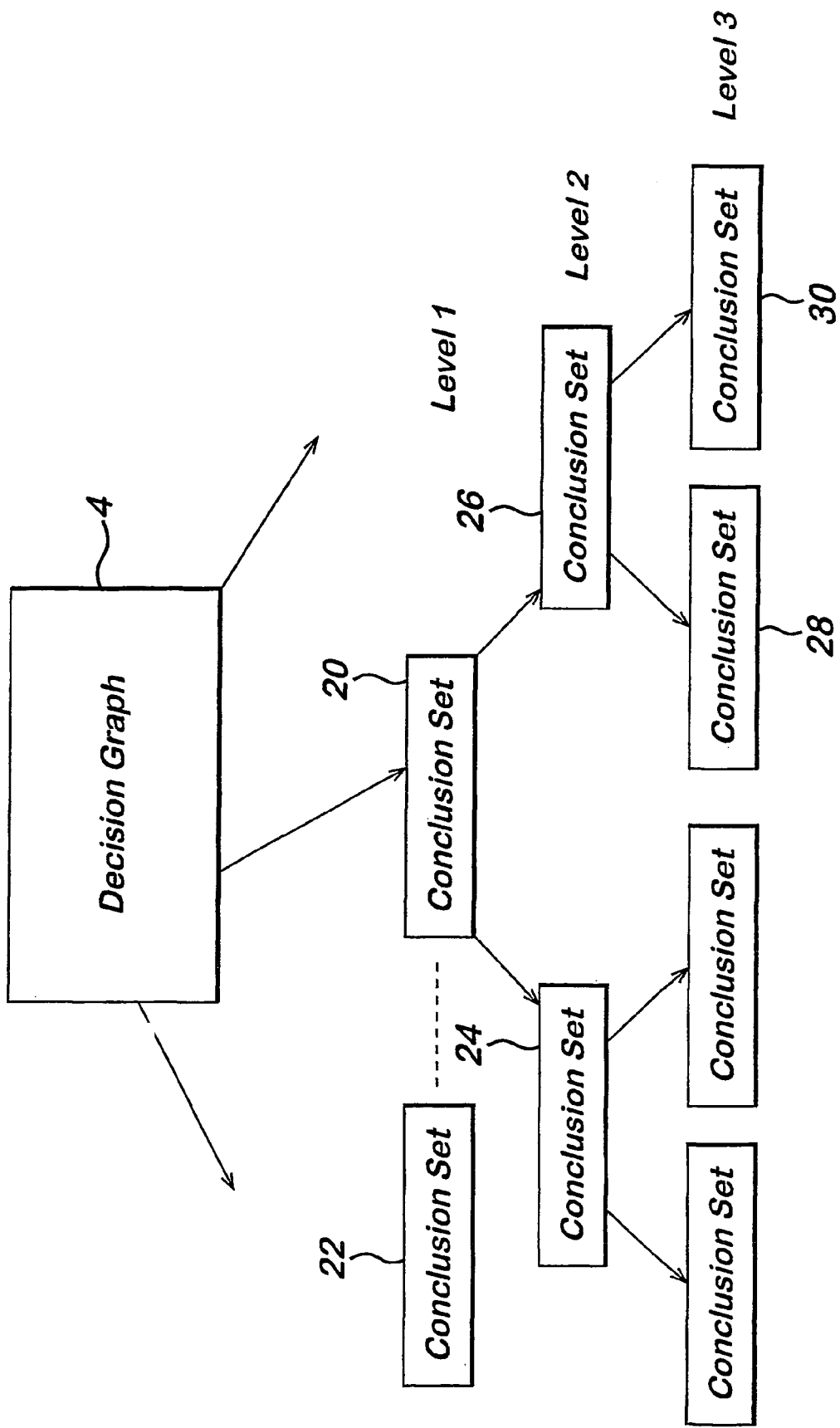
Figure 3:
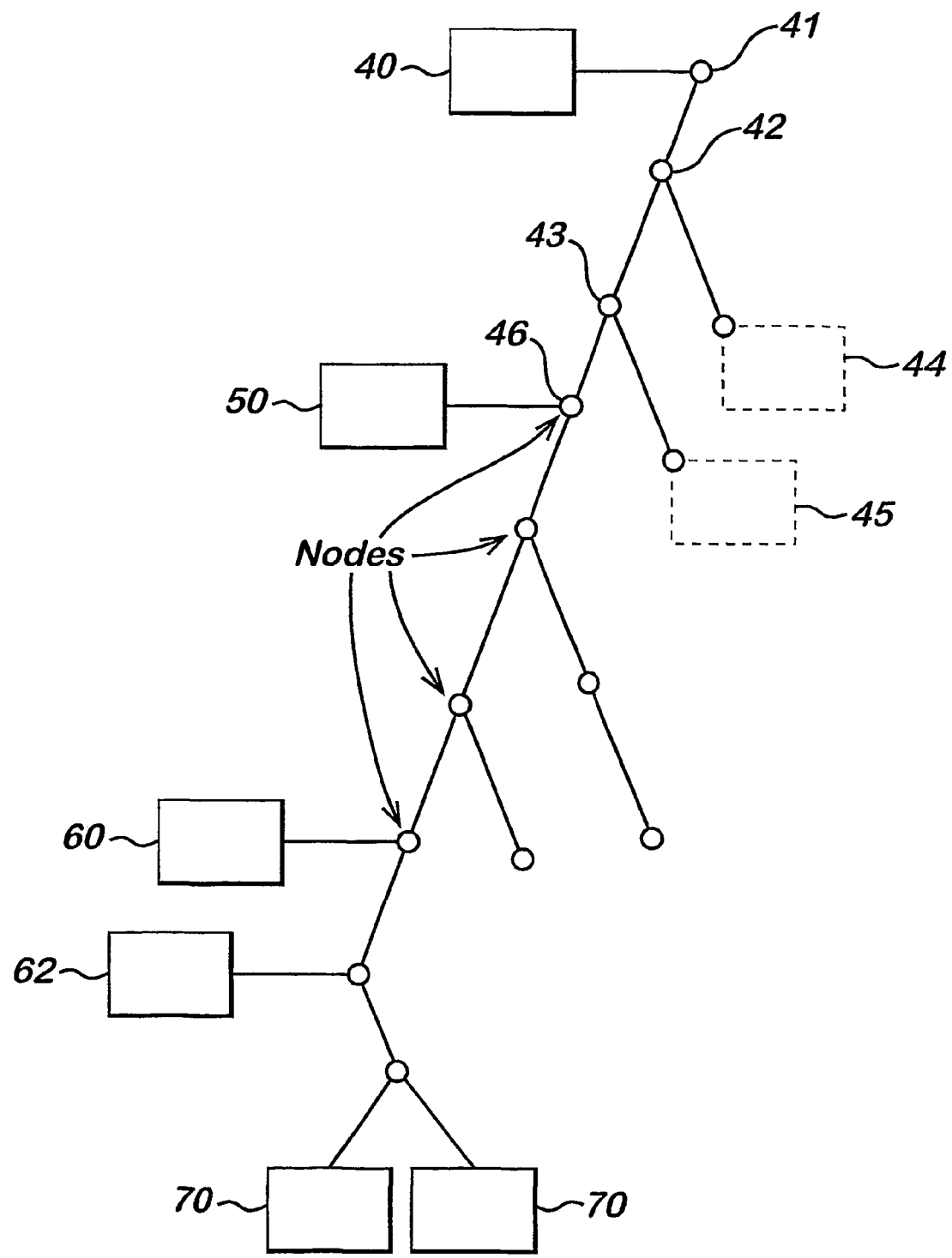

The present invention will further be described, by way of example, with reference to the accompanying drawings, in which:

FIG. 1 schematically illustrates a database having conclusion sets arranged in a conventional manner;

FIG. 2 schematically illustrates a database having conclusion sets arranged in accordance with the present invention; and FIG. 3 schematically illustrates a database having conclusion sets distributed within the decision graph, and constituting an embodiment of the present invention.

The database shown in FIG. 1 has an index 2 which comprises a decision graph 4 and a plurality of conclusion sets 6, 8, 10, 12 and 14. Each conclusion set is reached by one, and only one, path through the decision graph. However each conclusion then points to relevant entries within a data store 16.

The decision graph 4 comprises a plurality of decision nodes at which a search key is matched with decision criteria in order to define which path should be taken through the decision graph. The internal organisation of the keys within decision graph does not constitute part of the present invention, and consequently need not be described in detail here. However prior art indexing structures, such as the B-tree index may be utilised within the decision graph.

In the arrangement shown in FIG. 1, all the conclusion sets 6, 8, 10, 12 and 14 have equal significance thus no conclusion set is more hierarchically significant than any other conclusion set and indeed there may be many hundreds or indeed thousands of conclusion sets.

In the arrangement shown in FIG. 2 the conclusion sets are arranged in a hierarchical structure. In the arrangement illustrated there are three levels of conclusion sets with level one being the hierarchically most significant, and level three being the hierarchically least significant. Thus in this arrangement, there is only one quarter of the number of level one conclusion sets as there are level three conclusion sets, and again in this example one level one conclusion set marks the entry to six other conclusion sets. Clearly, as the number of levels increase then for a given number of conclusion sets at the least significant level, the number of level one conclusion sets becomes progressively diminished.

Suppose now that it is desired to insert an entry into the database. The decision graph is navigated in accordance with the insertion key for the entry, as would be the case in prior art databases, to discover which conclusion set the entry belongs to. In the database illustrated in FIG. 1, this would lead to one conclusion set being uniquely identified. However, in the present invention this results in one conclusion set 20 of a number of level one conclusion sets (of which only two 20 and 22 are shown for clarity) being identified. Advantageously the level one conclusion sets 20 and 22 are also held in fast memory, that is either a fast mass media storage device or better still semiconductor memory, such that the time overhead in inserting data into conclusion set 20 is small compared to the time required to insert data into one of the conclusion sets 6, 8, 10, 12 and 14 of a conventional database. Indeed, if the level one conclusion sets 20 and 22 are held in semiconductor memory then there is no I/O cost incurred in writing to them.

During time, as more and more data is inserted into the database, the conclusion set 20 begins to fill. Once the number of entries in the conclusion set 20 reaches a predetermined number, corresponding to the conclusion set being fill, the entries in the conclusion set 20 are migrated down to the immediately subordinate conclusion sets 24 and 26 which belong to level 2 of the hierarchical structure.

The decision on which of the lower level conclusions sets 24 and 26 receives an entry from the level one conclusion sets 20 is determined by continuing the navigation rules which exist within the decision graph 4. Thus, for example, if the decision graph 4 has rules based on individual bit values in increasing order of bit number, then the rule for migrating data from the top level conclusion set to the second level conclusion set 24 and 26 will use the next bit in the search key to determine which of the conclusion sets 24 or 26 should be recipient for each item of data. During this migration process, the conclusion set 20 becomes emptied.

The process of migration from an Nth level to an N+1th level occurs at each level within the conclusion set hierarchy as each conclusion set therein fills up. Thus once conclusion set 26 becomes fill, it in turn migrates its data to its subordinate conclusion sets 28 and 30 on the third level of the hierarchy. In this example, the third level is the lowest level of the hierarchy and the conclusion sets 28 and 30 are not able to pass their data down to subordinate conclusion sets. However, if four or more levels of conclusion sets were included within this hierarchical structure, then the conclusion sets 28 and 30 could indeed migrate their data to their own subordinate conclusion sets as and when they became full. It can be expected that, assuming a random distribution of keys, that during migration half of the entries in the conclusion set 20 will go to conclusion set 24 and the other half will go to conclusion set 26. This process is repeated at each level of migration such that all of the entries are substantially equally distributed throughout the lower level conclusion sets.

The I/O cost of a migration can be illustrated in the operation of migrating data from conclusion set 26 to conclusion sets 28 and 30. In this process, the data must be read from the conclusion set 26, which requires one read from disc. The lower level conclusion sets 28 and 30 must also have their data read from disc, this requires two read operations. The data from the conclusion set 26 is then sorted to correctly point to the destination set 28 or 30, the entries are then updated and then the data for the two lower level conclusion sets 28 and 30 are written back to the disc, requiring two write operations. Then the conclusion set 26 is emptied, which requires one write operation. Thus this gives a total cost of six input/output operations per migration. However this single migration may effect hundreds of entries. It should also be noted that the migration from the top level conclusion set 20 will be less because it will typically reside in memory and consequently only the two reads to sets 24 and 26 and the writes to these sets 24 and 26 must be performed.

Assuming the hierarchical structure as shown in FIG. 2, where the conclusion set has S sub-levels (where S=2 in this case, S=(L−1) where L is the number of levels) the number of I/O operations required to move an entry to the bottom most level is 6S. However, as each migration operation moves an entire (full) conclusion set which contains E entries, then the I/O cost per entry is given by:

$$I/O \text{ cost} = \frac{6S}{E}$$

therefore if E is large enough and/or S is small enough the I/O cost can be significantly reduced compared to the prior art scheme illustrated in FIG. 1 which has an I/O cost of 2 per entry. Thus, with the conclusion set that holds 100 entries, and a conclusion set depth of 8, the I/O cost per insert is 6×8/100=0.48.

It should be noted that for a fixed index size, whilst reducing S increases the insert throughput, it also increases the number of conclusion sets that must be held in memory for the benefit to be realised.

When querying the index for a specific key, each conclusion set in a single path running to the very least significant conclusion set must be queried. Thus, if the hierarchical structure consists of L levels, then L conclusion sets must be queried in order to find all results that match the key, since the key may reside at any level within the hierarchy. Thus this indexing scheme increases throughput, or the ease at which entries may be added to the index, at the expense of degrading query performance. However, this trade-off is acceptable in any application which has to accept large amounts of data but queries it infrequently. An example of such an application is a fraud detection system that has to load every transaction, but only queries those transactions relating to suspicious activity.

It is thus possible to provide an improved database performance by modifying the structure of the conclusion sets into a hierarchical structure.

The inventor has realised that the conclusion sets need not all be at the lowest level of the database structure. As noted hereinabove, in the distributed structure shown in FIG. 2, data is inserted into the first conclusion set found, ie level 1 conclusion sets, and is then progressively migrated to lower levels.

Thus the insert overhead can be further reduced if the conclusion sets are distributed through the decision index structure.

FIG. 3 shows a modified database where the conclusion sets are arranged in a hierarchical structure, and wherein the structure extends into the decision graph.

FIG. 3 illustrates a portion of a decision graph wherein the decision graph has been constructed with a inter-conclusion set distance Q=3, such that a conclusion set 40, 50 and 60 is allowed at every third branching node. Suppose that we join the database at a time where the data contained therein is such that conclusion set 40 has just been created, but that conclusion sets 50 and 60 have not yet been created.

During use, data is added to the database, and the content of that data is such that the conclusion set 40 becomes full. Once this occurs, the information within the conclusion set is redistributed en masse by creating the lower level node 42, optionally node 43, and distributing the data from conclusion set 40 into new temporary conclusion sets 44 and 45 shown in outline in FIG. 3. Filling of the database then continues until conclusion set 40 fills again. It then attempts to redistribute its contents to its subordinate conclusion sets. This in turn may make one of them full and so it becomes necessary to remove the fill temporary conclusion set from the exit path of node 42 and to insert one or more further nodes and additional conclusion sets as required.

This can continue until such time as conclusion set 50 is established as an exit to node 46. At this time, the inter-conclusion set distance between conclusion sets 40 and 50 then corresponds to the distance Q specified by the designer or user of the database. Under these conditions, a check is made to see if an intermediate conclusion set exists in the decision path extending between nodes 41 and 46. Any conclusion sets in this decision path are removed and their contents are moved to conclusion set 50.

As conclusion set 50 fills up, new temporary conclusion sets may be created until such time as conclusion set 60 is created, and so on. Thus it becomes possible for the inter-conclusion set distance between conclusion sets which are not in the lowermost layers of the decision index to be held at a specified inter-conclusion set spacing. In the arrangement shown in FIG. 3 conclusion sets 62 and 70 represent the lowermost layers of the database, and indeed conclusion sets 60, 62 and 70 can represent levels 1, 2 and 3 of conclusion sets in the arrangement shown in FIG. 2.

As before, the mass redistribution of conclusion set entries to lower level conclusion sets results in a reduced disc input/output penalty compared with the writing of individual items of data. Furthermore, the data entry cost into the structure shown in FIG. 3 is further reduced since an entry is inserted into the first conclusion set found. Each entry from a full conclusion set is then moved to the appropriate lower level conclusion set which is found by following the decision graph from the full conclusion set via the entry to be moved.

When querying the database, the decision path for the relevant key has to be navigated right to the lowermost level conclusion set and each conclusion set found on route must also be queried as it may contain data matching the search key criteria.

The invention claimed is:

1. A computer-implemented method of organizing storage of data in a database, using a data processor, in which conclusion sets for the database are arranged in a hierarchical structure with a plurality of levels of significance including a first level of significance and a very least significant level of significance, the conclusion sets storing data which matches search criteria or pointers which point to the location of the data which matches the search criteria, and in which the conclusion sets are arranged such that items are inserted into a selected conclusion set at the first level of significance until the number of items reaches a threshold value for the selected conclusion set, and then the contents of the selected conclusion set are migrated to subordinate conclusion sets, thereby emptying the selected conclusion set, and wherein following migration of the contents from the selected conclusion set, further insertions can be made into that conclusion set, wherein the conclusion sets are distributed throughout a decision graph of the database, the decision graph comprising a plurality of branch nodes at which a search key is matched with decision criteria in order to define which decision path should be taken through the decision graph, each conclusion set being reached by one, and only one, decision path through the decision graph; wherein conclusion sets are formed at some but not all of the branch nodes; and wherein the branch nodes at which conclusion sets are not formed define decision paths extending between the branch nodes at which conclusion sets are formed, in which the decision graph is constructed so as to maintain a specified inter conclusion set distance throughout the majority of the decision graph, and in which the decision graph comprises a plurality of branch nodes., and wherein the decision graph is constructed so as to maintain a specified inter conclusion set distance defined by an integer Q throughout the majority of the decision graph by forming a conclusion set at every other branch node if Q=1, at every second branch node if Q=2, and at every $n^{th}$ branch node if Q=n, wherein Q is greater than zero.

2. A method as claimed in claim 1, in which, during migration the data in the selected conclusion set is compared with a search criterion in order to select which of the immediately subordinate conclusion sets an entry is transferred to.

3. A method as claimed in claim 1, in which conclusion sets having a hierarchical significance above a predetermined value are stored, in use, in fast memory.

4. A method as claimed in claim 1, in which during migration of data from a conclusion set, the data is migrated to subordinate conclusion sets on the basis of the specific data content.

5. A method as claimed in claim 1, in which the contents of a conclusion set are migrated en masse.

6. A method as claimed in claim 1, in which once a given conclusion has a predetermined number of entries in it, its contents are migrated to its immediately subordinate conclusion sets.

7. A method as claimed in claim 1, wherein when querying the database for data or pointers which match a search criterion, each conclusion set in a single path running to the very least significant conclusion set must be queried, since the data or pointers may reside at any level of the hierarchy.

8. A method as claimed in claim 1, wherein the contents of the selected conclusion set are migrated to subordinate conclusion sets by following the decision graph.

9. A method as claimed in claim 1, wherein the decision graph is constructed so as to maintain a specified inter conclusion set distance by:

establishing a first conclusion set at the first level of significance (level 1);

establishing one or more temporary conclusion sets; and migrating the contents of the first conclusion set to the temporary conclusion set(s) until such time as a second conclusion set is established at the specified inter conclusion set distance from the first conclusion set, whereupon the temporary conclusion set(s) are removed and their contents are moved to the second conclusion set.

10. A computer-implemented database encoded in a computer storage medium, in which conclusion sets of the database are arranged in a hierarchical structure with a plurality of levels of significance including a first level of significance and a very least significant level of significance, the conclusion sets storing data which matches search criteria or pointers which point to the location of the data which matches the search criteria, and in which the conclusion sets are arranged such that items are inserted into a selected conclusion set at a first level of significance until the number of items reaches a threshold value for the selected conclusion set, and then the contents of the selected conclusion set are migrated to subordinate conclusion sets, thereby emptying the selected conclusion set, wherein following migration of the contents from the selected conclusion set, further insertions can be made into that conclusion set, wherein the conclusion sets are distributed throughout a decision graph of the database, the decision graph comprising a plurality of branch nodes at which a search key is matched with decision criteria in order to define which decision path should be taken through the decision graph, each conclusion set being reached by one, and only one, decision path through the decision graph; wherein conclusion sets are formed at some but not all of the branch nodes; and wherein the branch nodes at which conclusion sets are not formed define decision paths extending between the branch nodes at which conclusion sets are formed, in which the decision graph is constructed so as to maintain a specified inter conclusion set distance throughout the majority of the decision graph, and in which the decision graph comprises a plurality of branch nodes, and wherein the decision graph is constructed so as to maintain a specific inter conclusion set distance defined by an integer Q throughout the majority of the decision graph by forming a conclusion set at every other branch node if $Q=1$, at every second branch node if $Q=2$, and at every $n^{th}$ branch node if $Q=n$, wherein Q is greater than zero.

* * * * *